(12) United States Patent
Zens

(10) Patent No.: US 6,838,793 B2
(45) Date of Patent: Jan. 4, 2005

(54) ELECTROMOTOR AND DRIVING AXLE WITH A BUILT-IN ELECTROMOTOR

(75) Inventor: Robert Zens, Moosburg (DE)

(73) Assignee: Jungheinrich Moosburg GmbH, Moosburg (DE)

(*) Notice: Subject to any disclaimer, the term of this patent is extended or adjusted under 35 U.S.C. 154(b) by 0 days.

(21) Appl. No.: 10/311,779

(22) PCT Filed: Jun. 22, 2001

(86) PCT No.: PCT/EP01/07105
§ 371 (c)(1),
(2), (4) Date: Aug. 11, 2003

(87) PCT Pub. No.: WO01/99258
PCT Pub. Date: Dec. 27, 2001

(65) Prior Publication Data
US 2004/0012286 A1 Jan. 22, 2004

(30) Foreign Application Priority Data
Jun. 23, 2000 (DE) .......................... 200 11 138

(51) Int. Cl.⁷ ............................................. H02K 11/00
(52) U.S. Cl. .......................... 310/68 B; 310/89; 310/90
(58) Field of Search ............................ 310/68 B, 88–91

(56) References Cited

U.S. PATENT DOCUMENTS

| 3,826,933 A | * | 7/1974 | Anselmino ................. 310/168 |
| 5,920,134 A | | 7/1999 | Mayer et al. |
| 5,998,894 A | * | 12/1999 | Raad ....................... 310/68 B |
| 6,043,643 A | | 3/2000 | Message et al. |
| 6,225,715 B1 | * | 5/2001 | Hoda et al. ................ 310/67 R |

FOREIGN PATENT DOCUMENTS

| DE | 196 14216 A1 | 3/1997 |
| DE | 198 40 006 A1 | 2/2000 |
| WO | WO 00/06483 | 2/2000 |

OTHER PUBLICATIONS

German Search Report for German basic application dated Mar. 22, 2001.
JP 622225909 A., In: Patent Abstracts of Japan dated Oct. 3, 1987.
International Preliminary Examination Report dated Apr. 2, 2003.

* cited by examiner

*Primary Examiner*—Thanh Lam
(74) *Attorney, Agent, or Firm*—Scott D. Wofsy; Edwards & Angell, LLP

(57) ABSTRACT

The invention relates to an electromotor comprising a housing (5) which consists of a ferromagnetic material and a rotationally driven shaft (13) which is located in said housing (5). Said housing comprises at least one bearing shield (25), with a bearing (31) for the shaft (13). The bearing (31) has sensor means (33) for determining the state of rotation of the shaft (13). According to the invention, the bearing (31) is accommodated in a screening bushing (35) which is located in a bearing receiving opening (29) of the bearing shield (25) and which consists of a non-ferromagnetic material. A cover bushing (37) consisting of ferromagnetic material which is connected to the bearing shield (25) and which surrounds the shaft (13) is provided, and surrounds the bearing (31) and the screening bushing (35) on the inside of the housing.

11 Claims, 2 Drawing Sheets

ELECTROMOTOR AND DRIVING AXLE WITH A BUILT-IN ELECTROMOTOR

DESCRIPTION

The invention relates to an electric motor, in particular a three-phase electric motor, having a housing composed of ferromagnetic material, in particular steel, and having a shaft, which can be driven in a rotating manner, in the housing, with the housing having at least one end frame with a bearing for supporting the shaft, and with the bearing having sensor means for detection of the rotation state of the shaft.

The invention relates in particular to a brushless three-phase asynchronous electric motor of the type mentioned initially, which is installed in a drive shaft of a vehicle, in particular of an industrial truck, in order to drive drive wheels on the drive shaft.

Drive shafts of the type under consideration and with a built-in three-phase electric motor are known, for example, from DE 198 40 006 A1 and from DE 298 19 114 U1. The shaft housing is at the same time in the form of a motor housing, with the stator of the motor being fixed in the shaft housing, and a hollow shaft passing axially through the rotor of the motor and being driven by the electric motor such that it rotates. The hollow shaft is the input shaft of a differential transmission which is accommodated in the shaft housing and whose output drive shafts drive the wheels which are associated with both ends of the drive shaft.

In order to provide open-loop and closed-loop controls of the electric motor on the basis of the desired vehicle speed, vehicle acceleration, direction of travel etc., the actual rotation state of a shaft in the drive run, in particular of the hollow shaft, is detected by means of a rotation angle sensor. It is being proposed that a sensor bearing be used for this purpose, in the form of a roller bearing with at least one integrated rotation angle incremental sensor. Sensor bearings such as these are commercially available, and are described, for example, in EP 0838 683, EP 0992 797 or EP 0875 683. Trials with a sensor bearing which is arranged directly in the bearing holding opening of the end frame of a housing of an electric motor and which provide a bearing for the motor shaft have shown that the output signals from the rotation angle sensors were frequently subject to severe interference, so that it was impossible to ensure reliable detection of the actual value of the rotation state of the motor shaft. Particularly in the case of a drive motor which is integrated in a vehicle drive shaft, however, reliable detection of the rotation state of a drive shaft is important in order to make it possible to provide reliable drive control.

The invention is thus based on the object of providing an electric motor of the type mentioned initially, and in particular a drive shaft which is equipped with such an electric motor, in which it is possible to detect the rotation state of the shaft reliably by means of a sensor bearing which is used in the end frame.

In order to achieve this object, the invention proposes that the bearing is held in a shielding bush, which is arranged fixed in the bearing holding opening in the end frame and is composed of a nonferromagnetic material, and in that a covering bush is provided, which is connected to the end frame or is in the form of an integral part of the end frame, surrounds the shaft, is composed of ferromagnetic material and, inside the housing, surrounds the bearing and the shielding bush. The invention furthermore proposes in order to achieve the object that the electric motor is in the form of an integrated drive unit of a drive shaft for a vehicle, in particular of an industrial truck, and in that the housing forms at least a part of the shaft housing of the drive shaft.

The invention is based on the idea that the signal interference mentioned above with a sensor bearing which is used directly in the steel end frame of the motor housing could be caused by the stray flux of the magnetic field produced by the electric motor, with the stray flux influencing the sensor electronics. In particular, angle sensors with Hall sensors react in a sensitive manner to the magnetic stray flux of the motor passing via the housing walls and the end frame, in such a way that the measurement signal has such severe interference superimposed on it that it is impossible to evaluate this measurement signal for control purposes.

In the electric motor according to the present invention, the shielding bush offers increased magnetic reluctance while, in contrast, the covering bush results in "channelization" of the magnetic flux which passes from the motor housing casing via the end frame of the shaft, and hence to the interior of the motor. The magnetic stray flux is thus essentially guided from the housing casing via the end frame and the covering bush to the shaft, such that it bypasses the sensor bearing and the electronic components which are provided on it.

The nonferromagnetic shielding bush should be composed of a mechanically robust material, preferably a metal such as bronze or brass. A shielding bush composed of austenitic steel, aluminum or ceramic would also be feasible.

In order to guide the magnetic flux efficiently while bypassing the sensor bearing, the shaft aperture opening in the covering bush through which the shaft passes should have a circumferential surface whose radial distance from the shaft is very small. The air gap, which corresponds to this radial distance, between the covering bush and the shaft should, as far as possible, not be significantly broader than 0.5 mm.

As a further measure for efficient guidance of the magnetic stray flux while bypassing the sensor bearing, the invention provides that the covering bush has a collar which extends in the axial direction of the shaft and bounds an air gap which is as small as possible between it and the shaft. This collar offers a larger surface area for the magnetic flux to pass from the covering plate to the shaft.

The measures which have been mentioned above mean that it is possible to use a commercially available sensor bearing as the bearing for the motor shaft and, furthermore, that it is possible to detect the rotation state of the motor shaft in the electric motor reliably and virtually without any interference. This is particularly important in the case of a drive shaft with an electric motor such as this as an integrated drive unit, in which the actual value of the drive state is detected reliably by detecting the rotation state of the shaft which is driven by the motor.

The invention will be explained in more detail in the following text with reference to the Figures, in which:

FIG. 1 shows a drive shaft with a built-in brushless three-phase electric motor for providing the traction drive for a forklift truck. A drive shaft such as this is described in more detail, for example, in DE 198 40 006 A1, to which reference is made.

Figure 1:
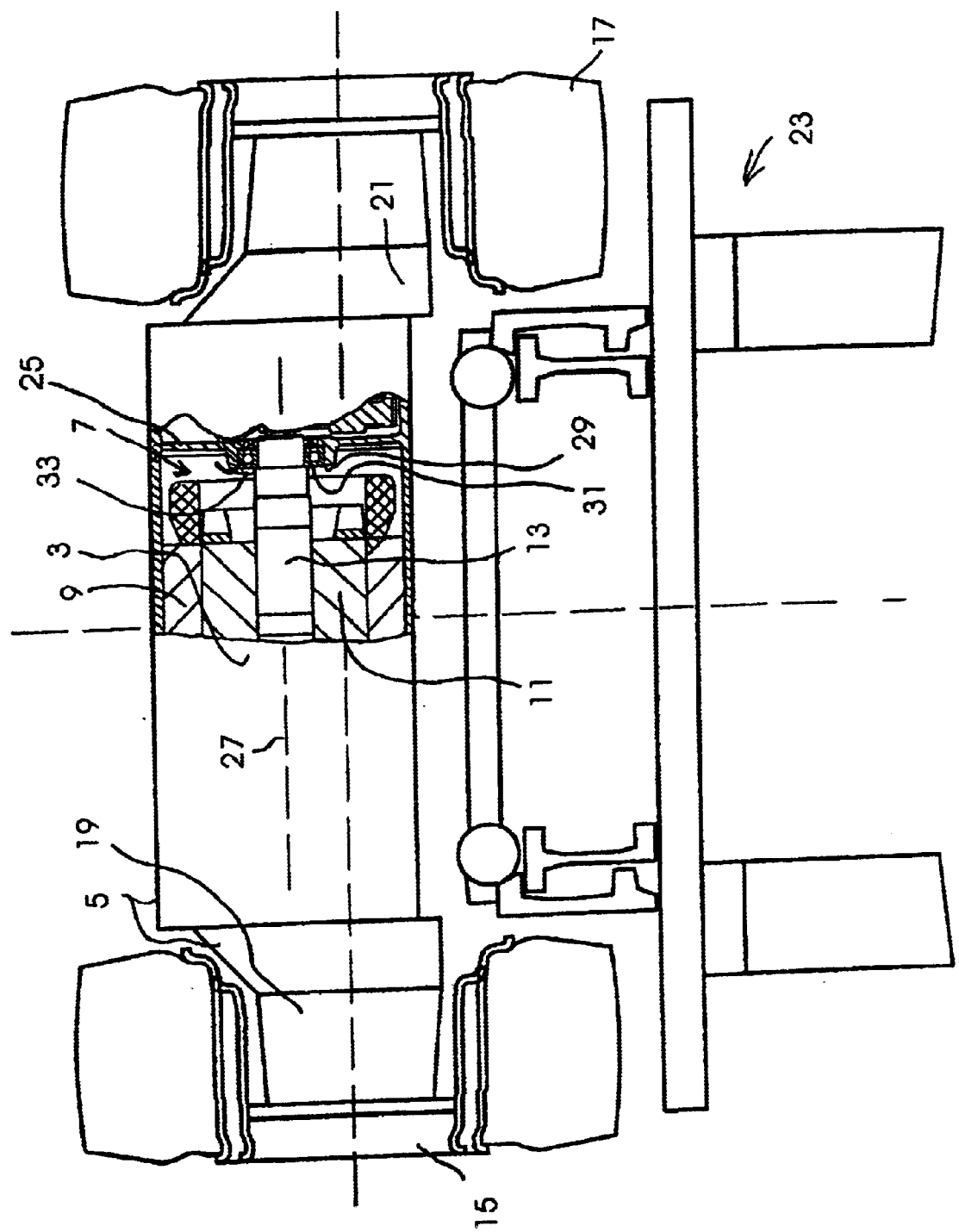
FIG. 1 shows a highly schematic plan view of a drive shaft unit, which is illustrated partially in the form of a section and partially cut away, with a sensor bearing without the measures proposed according to the invention.

FIG. 1 shows a central section 3 of the shaft housing 5 partially cut away, so that it is possible to see the elements of the integrated electric motor 7. The stator 9, which is held fixed in the housing 5, is connected to the outer circumferential wall (the casing) of the approximately cylindrical housing center part 3. A hollow shaft 13 passes through the rotor 11 (which is held in the stator 9 such that it can rotate) of the three-phase electric motor, is driven by the electric motor 7 and acts as an input shaft for a differential transmission (which is not shown in the Figures), whose output drive shafts drive the drive wheels (15, 17) via a respective spur gear system transmission, as indicated in the form of a schematic sectional illustration in FIG. 1. The shaft which is shown in plan view form in FIG. 1 has a so-called porch offset of the housing center part 3 with respect to the outer parts 19, 21. This results in better space conditions, in particular for accommodating the lifting column/lifting frame 23 of a forklift truck. The shaft housing 5 is the load-bearing component of the drive shaft and for this reason must be designed to be mechanically robust. In the case of the example, both the casing part 3 of the shaft housing 5 and the end frame 25, which forms an intermediate wall of the shaft housing 5 running transversely with respect to the axis 27 of the motor shaft 13 and is connected directly to the housing center part 3, are composed of steel. As shown in FIG. 1, a roller bearing 31, for example a ball bearing, is inserted in the bearing holding opening 29 in the end frame 25 and supports the motor hollow shaft 13 at its end remote from the differential transmission, such that it can rotate. The roller bearing 31 is a sensor bearing, which has angle sensors 33, one of which can be seen. The rotation state of the motor hollow shaft 13 can thus be detected by means of the sensor bearing 31, 33. The sensor bearing 31, 33 thus preferably has at least two Hall sensors 33, which are arranged at an angular interval from one another on the circumference of the bearing 31, so that they can supply signals with a phase shift, as is important for identifying the rotation direction. The signals supplied from the sensors 33 are evaluated in the form of actual value signals by a control unit (which is not shown) for controlling the drive to the wheels 15, 17. The control unit can thus determine the rotation speed, the rotation acceleration, the change in the rotation angle and the rotation direction of the shaft. In the case of a drive shaft as shown in FIG. 1 with a sensor bearing 31, 33 which makes direct contact with the steel material of the end frame 25, the signals supplied from the rotation angle sensors 33 were frequently subject to severe interference, so that it was not always possible to achieve reliable drive control. It has been found that the major reason for this interference is the magnetic flux which is produced by the electric motor, passed via the housing casing wall and via the end frame 25 and via the sensor bearing 31, 33 inserted therein to the shaft 13, and which influences the electronic components of the sensor bearing 31, 33.

Figure 2:
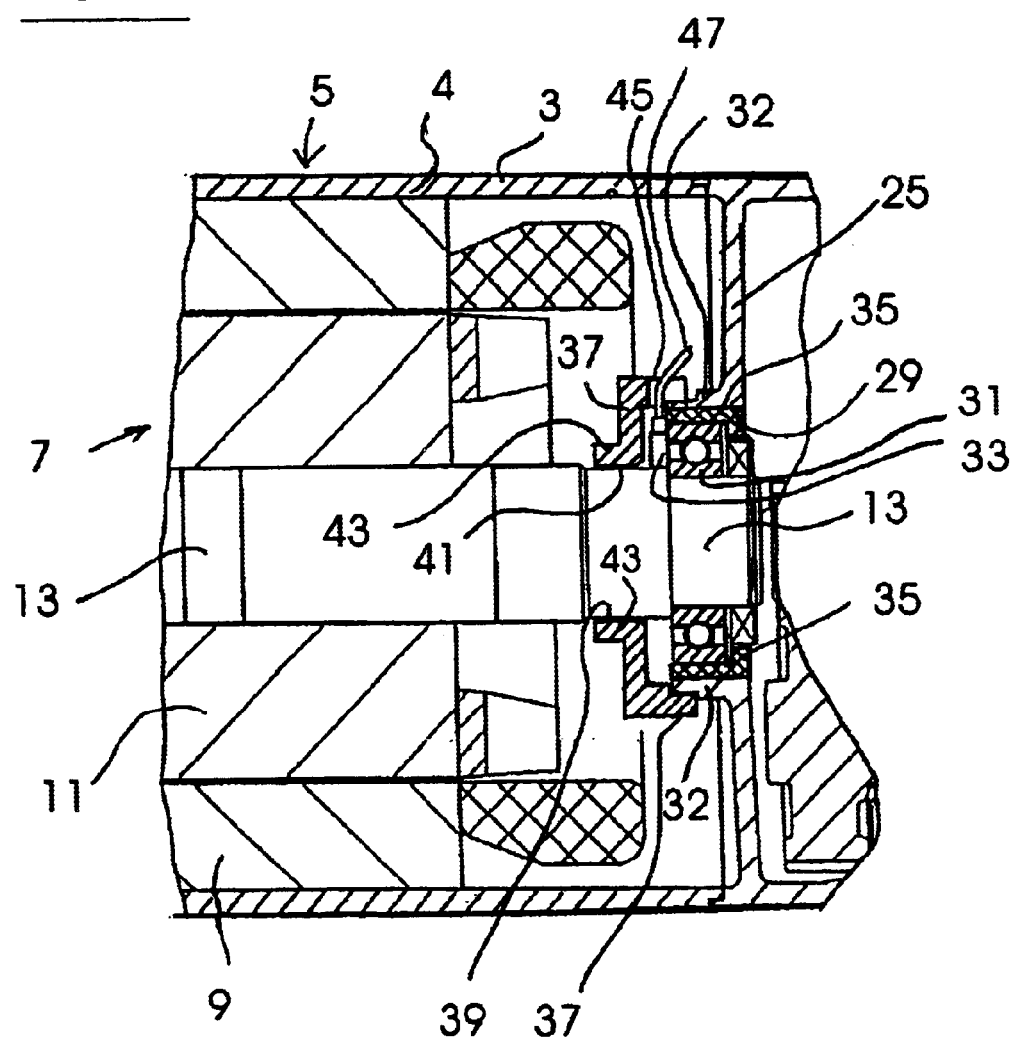
FIG. 2 shows the region of the shaft housing/motor housing that is illustrated cut away in FIG. 1, illustrated in an enlarged form, with FIG. 2 showing a shielding bush and a covering bush in accordance with the measures proposed according to the invention.

FIG. 2 shows the internal area of the drive shaft, as can be seen by cutting away the central shaft housing part 3 in FIG. 1, with the relevant motor components, illustrated enlarged, although FIG. 2 has been modified from the illustration in FIG. 1 in that measures according to the invention are shown for suppressing the abovementioned interference with the rotation angle sensor signal. These measures include accommodation of the roller bearing 31 in a shielding bush 35 composed of a nonferromagnetic material, such as brass or bronze. The shielding bush is held fixed in the bearing holding opening 29 in the end frame 25, with the shielding bush 35 preferably extending over the entire axial length of the end frame 25 and of the bearing 31, and possibly beyond them. In the case of the example, the end frame 25 has a collar 32 which contains the bearing holding opening 29. A covering bush 37, which is composed of ferromagnetic material, preferably steel, is placed radially externally on the collar 32 and is connected directly to the end frame 25. Inside the housing, that is to say on the side of the end frame 25 facing the rotor 11, the covering bush 37 covers the sensor bearing 31, 33 and the shielding bush 35. The radially inner circumference 39 of the covering bush 37 bounds, together with the shaft 13, a narrow air gap 41, with a gap width of, for example, 0.5 mm. In order that the radially inner circumferential surface 39 is as large as possible, the covering bush 37 has a radially inner collar 43, which extends in the axial direction towards the rotor 11.

The covering bush 37 is used to close a magnetic circuit which bypasses the sensor bearing 31, 33, with the magnetic stray flux being passed from the housing casing wall 4 via the end frame 25 and then via the covering bush 37 to the shaft 13. The shielding bush 35 forms a high magnetic reluctance, and thus provides shielding for the sensor bearing 31, 33.

It has been found that an arrangement as shown in FIG. 2 achieves effective suppression of interference with the rotation angle sensors 33.

As can be seen in FIG. 2, the covering bush 37 may have cable aperture openings 45 for sensor cables 47 which are connected to the motor control unit (which is not shown).

It should be mentioned that the shielding bush 35 and/or the covering bush 37 may be elements composed of a number of parts.

On the other hand, the covering bush 37 may also be formed cohesively and integrally with the end frame 25, thus being an integral part of the end frame 25.

In addition to the bearing holding opening 29, the end frame may have further openings, for example for cooling of the motor.

What is claimed is:

1. A three-phase electric motor, comprising:
   a housing composed of a ferromagnetic material, and having a shaft which can be driven in a rotating manner, in the housing, with the housing having at least one end frame with a bearing for supporting the shaft, and with the bearing having sensor means for detection of the rotation state of the shaft, wherein the bearing is held in a shielding bush which is arranged fixed in a bearing holding opening in the end frame and is composed of a nonferromagnetic material, and a covering bush is provided, which is associated with the end frame, is composed of a ferromagnetic material and, inside the housing, surrounds the bearing and the shielding bush.

2. The electric motor as recited in claim 1, wherein the shielding bush is composed of at least one of bronze and brass.

3. The electric motor as recited in claim 1, wherein the shaft aperture opening in the covering bush through which the shaft passes has a circumferential surface whose radial distance from the shaft is less than 2.5 mm.

4. The electric motor as recited in claim 1, wherein the covering bush has a collar which extends in the axial direction of the shaft and surrounds the shaft with a small radial gap.

5. The electric motor as recited in claim 1, wherein the electric motor is in the form of an integrated drive unit of a drive shaft for a vehicle, and the housing forms at least a part of the shaft housing of the drive shaft.

6. A drive shaft having a built-in three-phase electric motor as recited in claim 1.

7. The electric motor as recited in claim 1, wherein the covering bush is connected to the end frame.

8. The electric motor as recited in claim 1, wherein the covering bush is an integral part of the end frame.

9. The electric motor as recited in claim 1, wherein the housing is composed of steel.

10. The electric motor as recited in claim 1, wherein the shaft aperture opening in the covering bush through which the shaft passes has a circumferential surface whose radial distance from the shaft is less than 1 mm.

11. The electric motor as recited in claim 5, wherein the vehicle is an industrial truck.

* * * * *